United States Patent
Chiang (12)

(10) Patent No.: US 10,108,822 B1
(45) Date of Patent: Oct. 23, 2018

(54) SYSTEM AND METHOD FOR RECOGNIZING ELECTRONIC ELEMENTS

(71) Applicant: Nzxt Inc., City of Industry, CA (US)

(72) Inventor: Tsung-Jung Chiang, City of Industry, CA (US)

(73) Assignee: NZXT INC., City of Industry, CA (US)

( * ) Notice: Subject to any disclaimer, the term of this patent is extended or adjusted under 35 U.S.C. 154(b) by 0 days.

(21) Appl. No.: 15/725,902

(22) Filed: Oct. 5, 2017

(51) Int. Cl.
*G06K 7/00* (2006.01)
*G06F 1/20* (2006.01)

(52) U.S. Cl.
CPC ............ *G06K 7/0008* (2013.01); *G06F 1/20* (2013.01)

(58) Field of Classification Search
CPC ........................... H05B 33/0845; A01K 61/85
USPC ....................................................... 340/572.1
See application file for complete search history.

(56) References Cited

U.S. PATENT DOCUMENTS

| | | | | |
|---|---|---|---|---|
| 7,621,662 B1* | 11/2009 | Colbert | ............... | B60Q 1/2611 |
| | | | | 362/479 |
| 2015/0163888 A1* | 6/2015 | Fredricks | ........... | H05B 37/0272 |
| | | | | 119/51.04 |
| 2015/0305120 A1* | 10/2015 | Wong | .................. | F21V 23/0464 |
| | | | | 705/7.15 |
| 2015/0305122 A1* | 10/2015 | Saes | ................... | H05B 33/0842 |
| | | | | 315/129 |

\* cited by examiner

*Primary Examiner* — Fabricio R Murillo Garcia
(74) *Attorney, Agent, or Firm* — Muncy, Geissler, Olds & Lowe, P.C.

(57) ABSTRACT

A system and a method for recognizing electronic elements are disclosed. The system includes at least two electronic elements and a control circuit board. The electronic elements include a fan, a light strip, or a combination of the fan and the light strip. The electronic elements are electrically connected in series. Each electronic element is provided with a recognition chip having a recognition code. The recognition chip of the next-preceding electronic element requests the recognition chip of the next-following electronic element to transmit the corresponding recognition codes back, so that the recognition chips of the electronic elements from first to last sequentially transmit the corresponding recognition codes back. The control circuit board is electrically connected with the first electronic element and sequentially receives the recognition codes according to the order of the at least two electronic elements connected in series.

14 Claims, 6 Drawing Sheets

SYSTEM AND METHOD FOR RECOGNIZING ELECTRONIC ELEMENTS

BACKGROUND OF THE INVENTION

Field of the Invention

The present invention relates to technology for recognizing electronic elements, particularly to a system and a method for recognizing different models of electronic elements.

Description of the Related Art

With the development of technology, desktop computers have advanced endlessly. The early desktop computer has a large volume to increase the heat dissipating capability. The late desktop computer has a slim and compact volume to save space. Nowadays, desktop computers pursue the more acousto-optic effect. Desktop computers have modification, such as having transparent desktop cases, internal lighting elements, and video cards with special shapes. Besides, the desktop computers connect with LED strips to generate the lighting effect and vary the color and twinkle of lights. Fans also connect with LED strips to form lighting fans. The variation of lights is produced by rotating fan blades of the lighting fans.

Each light strip has to connect with a motherboard to receive a control signal. However, the number of connection ports of the motherboard is limited. The number of the connection ports provided to light strips and lighting fans is insufficient. In addition, the light strips are connected to each other to save the connection ports required by the motherboard. Nevertheless, the motherboard cannot recognize each light strip. In this way, the light strips cascaded together perform the same function rather than achieve the different lighting effect.

To overcome the abovementioned problems, the present invention provides a system and a method for recognizing electronic elements so as to solve the afore-mentioned problems of the prior art.

SUMMARY OF THE INVENTION

A primary objective of the present invention is to provide a system and a method for recognizing electronic elements, which connects a control circuit board with a plurality of electronic elements in series, whereby all the elements are corresponded to each other in a one-on-one way. Each electronic element is provided with a recognition chip. The recognition chips communicate with each other through $I^2C$ interfaces.

Another objective of the present invention is to provide a system and a method for recognizing electronic elements, wherein the recognition chip of each electronic element has a recognition code. According to the coding content of the recognition code, the processor of a control circuit board detects the identification and the order of the electronic elements connected in series.

To achieve the abovementioned objectives, the present invention provides a system for recognizing electronic elements applied to a computer host. The system comprises at least two electronic elements comprising a light strip, a fan, or a combination of these, the at least two electronic elements are electrically connected in series, each of the at least two electronic elements is provided with a recognition chip comprising a recognition code corresponded thereof, the recognition chip of the next-preceding electronic element requests the recognition chip of the next-following electronic element to transmit the recognition codes corresponded thereof back, and the recognition chips of the electronic elements from first to last sequentially transmit the recognition codes corresponded thereof back; and a control circuit board electrically connected with the first electronic element and sequentially receiving the recognition codes according to the order of the at least two electronic elements connected in series.

In an embodiment of the present invention, the control circuit board is provided with a microprocessor which communicates with the recognition chip through an $I^2C$ interface. Besides, the recognition chips communicate with each other through $I^2C$ interfaces.

In an embodiment of the present invention, the control circuit board is provided with at least one conductive channel electrically connected with the electronic elements connected in series. The control circuit board independently recognizes and controls the electronic elements connected with the different conductive channel.

In an embodiment of the present invention, the recognition code comprises a classification code and a serial number, and the light strip and the fan have the different classification codes. The serial number corresponds to the order of the at least two electronic elements connected in series.

The present invention also provides a method for recognizing electronic elements applied to a computer host. The method comprises electrically connecting with at least two electronic elements in series, and the at least two electronic elements comprising a light strip, a fan, or a combination of these, and each of the at least two electronic elements provided with a recognition chip comprising a recognition code corresponded thereof, and the first electronic element electrically connected with a control circuit board; the control circuit board requesting the recognition chip of the first electronic element to transmit the recognition code corresponded thereof back, and the recognition chip of the first the electronic element transmitting the recognition code corresponded thereof back to the control circuit board and requesting the recognition chip of the next-following electronic element to transmit the recognition code corresponded thereof back; repeating a step of the recognition chip of the next-following electronic element transmitting the recognition code corresponded thereof back to the recognition chip of the next-preceding electronic element and requesting the recognition chip of the next-following electronic element to transmit the recognition code corresponded thereof back, until the recognition chip of the last electronic element transmits the recognition code corresponded thereof back; and the control circuit board sequentially receiving the recognition codes according to the order of the at least two electronic elements connected in series.

Below, the embodiments are described in detail in cooperation with the drawings to make easily understood the technical contents, characteristics and accomplishments of the present invention.

DETAILED DESCRIPTION OF THE INVENTION

The present invention provides a system and a method for recognizing the identification and models of light strips or fans as electronic elements in series.

Figure 1:
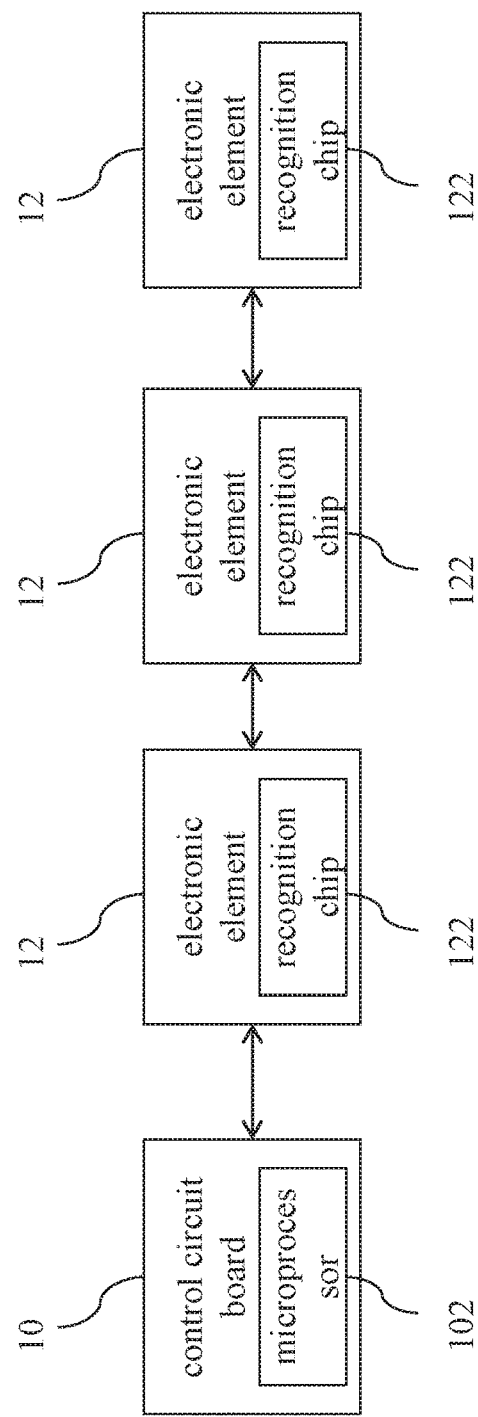
FIG. 1 is a block diagram showing a system for recognizing electronic elements according to an embodiment of the present invention.

Refer to FIG. 1. FIG. 1 is a block diagram showing a system for recognizing electronic elements according to an embodiment of the present invention. The system 10 comprises at least two electronic elements 12 and a control circuit board 10. The electronic elements 12 comprise a light strip, a fan, or a combination of these. For example, the electronic elements 12 comprise at least one light strip and at least one fan. Alternatively, the electronic elements 12 comprise at least two light strips. The fan is a lighting fan with LEDs and the light strip is a LED strip. The electronic elements 12 are electrically connected in series. Each electronic element 12 is provided with a recognition chip 122 comprising a recognition code corresponded thereof. The control circuit board 10 is electrically connected with the first electronic element 12. The control circuit board 10 is provided with a microprocessor 102. The microprocessor 102 requests the first electronic element 12 to transmit the recognition code back or transmit a command to the recognition chip 122 of the electronic element 12 to control the electronic element 12.

The microprocessor 102 of the control circuit board 10 communicates with the recognition chip 122 through an I²C interface. The recognition chips 122 communicate with each other through I²C interfaces.

The control circuit board 10 is provided with at least one conductive channel (not shown) electrically connected with at least two electronic elements 12 connected in series. For example, the control circuit board 10 is provided with multiple conductive channels (not shown) respectively electrically connected with multiple strips of electronic elements 12. Especially, the control circuit board 10 independently recognizes and controls the electronic elements 12 connected with different conductive channels.

Figure 2:
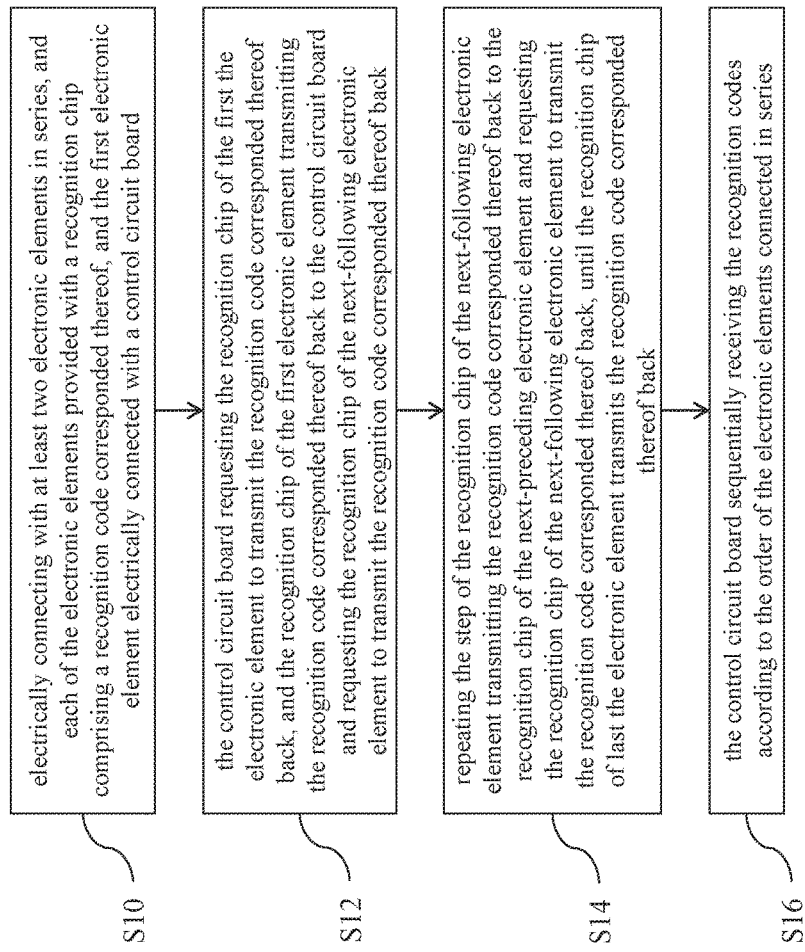
FIG. 2 is a flowchart showing a method for recognizing electronic elements according to an embodiment of the present invention.

FIG. 2 is a flowchart showing a method for recognizing electronic elements according to an embodiment of the present invention. In Step S10, at least two electronic elements are electrically connected in series, and the at least two electronic elements comprises a light strip, a fan, or a combination of these. As mentioned above, each of the electronic elements is provided with a recognition chip comprising a recognition code corresponded thereof, and the first electronic element electrically connected with a control circuit board. In Step S12, the control circuit board intends to know the identification of the electronic elements connected with the conductive channel. Thus, the control circuit board requests the recognition chip of the first electronic element to transmit the recognition code corresponded thereof back, and the recognition chip of the first electronic element transmits the recognition code corresponded thereof back to the control circuit board and requests the recognition chip of the next-following electronic element to transmit the recognition code corresponded thereof back. In Step S14, the recognition chip of the next-following electronic element transmits the recognition code corresponded thereof back to the recognition chip of the next-preceding electronic element and requests the recognition chip of the next-following electronic element to transmit the recognition code corresponded thereof back, which is repeated, until the recognition chip of the last electronic element transmits the recognition code corresponded thereof back. In Step S16, the control circuit board sequentially receives the recognition codes according to the order of the electronic elements connected in series.

The abovementioned steps are alternatively used to transmit a control signal. For example, the control circuit board transmits a command related to the twinkle of light strip No. 2. The command is transmitted to the recognition chip of light strip No. 2 through the neighboring electronic elements in a one-by-one way.

Figure 3A:
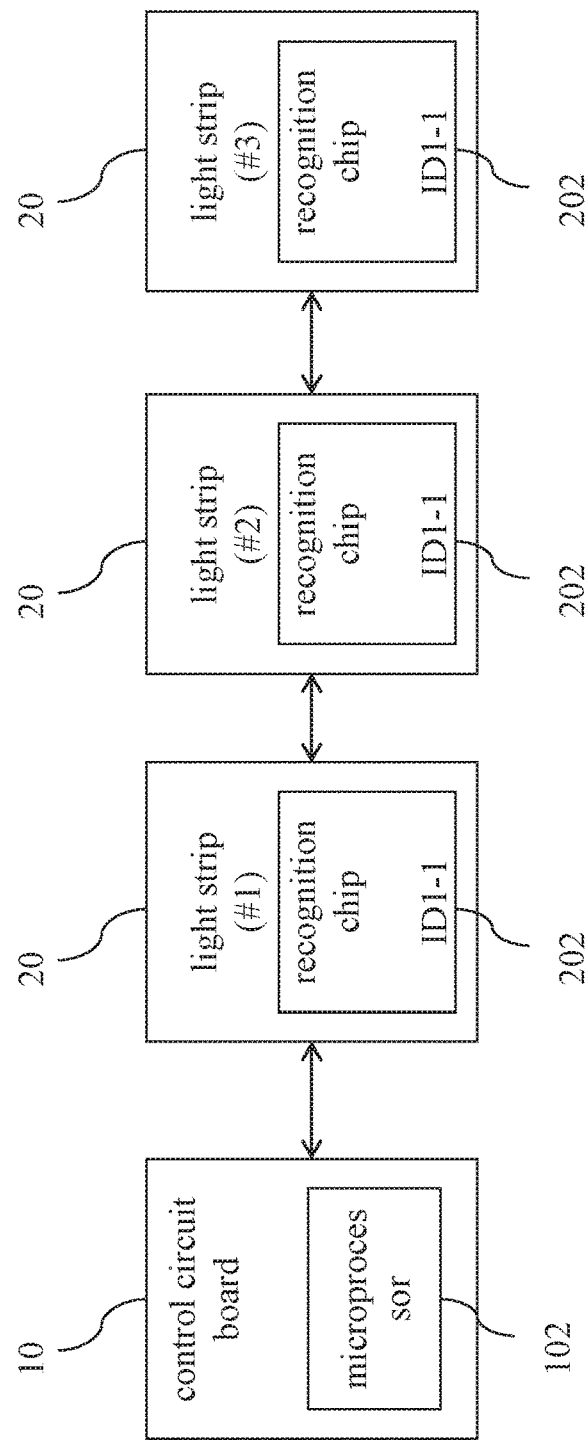
FIG. 3A is a diagram showing a system for recognizing the same model of light strips connected in series according to an embodiment of the present invention.

FIG. 3A is a diagram showing a system for recognizing the same model of light strips connected in series according to an embodiment of the present invention. Since the conductive channel is connected with the same model of light strips, their recognition codes are the same. All the recognition codes are ID1-1 in the embodiment. It is noted that the recognition code comprises a classification code and a serial number. Since a light strip is different from a fan, the light strip and the fan have different classification codes. The identical light strips have identical serial numbers. The identical fans also have identical serial numbers. The serial numbers are assigned to different models of light strips according to the order of the light strips connected in series. The serial numbers are also assigned to different models of the fans according to the order of the fans connected in series. In the embodiment, the microprocessor 102 of the control circuit board 10 is firstly connected with a recognition chip 202 of #1 light strip 20. Thus, the recognition chip 202 transmits a recognition code ID1-1 corresponded thereof back and informs the microprocessor 102 of a fact that the channel is connected with #1 light strip 20 corresponding to the recognition code ID1-1. When #1 light strip 20 is connected with next-following #2 light strip 20, a recognition chip 202 of #2 light strip 20 transmits its recognition code ID1-1 back to the recognition chip 202 of next-preceding #1 light strip 20. Then, the recognition chip 202 of #1 light strip 20 transmits the recognition code ID1-1 of the #2 light strip 20 back to the microprocessor 102 of the control circuit board 10. By the same token, #3 light strip 20 transmits its recognition code ID1-1 back to the microprocessor 102 of the control circuit board 10 through the recognition chips 202 of #1 light strip 20 and #2 light strip 20. In this way, the microprocessor 102 of the control circuit board 10 knows that three light strips 20 corresponding to the recognition codes ID1-1 are connected with the channel.

Figure 3B:
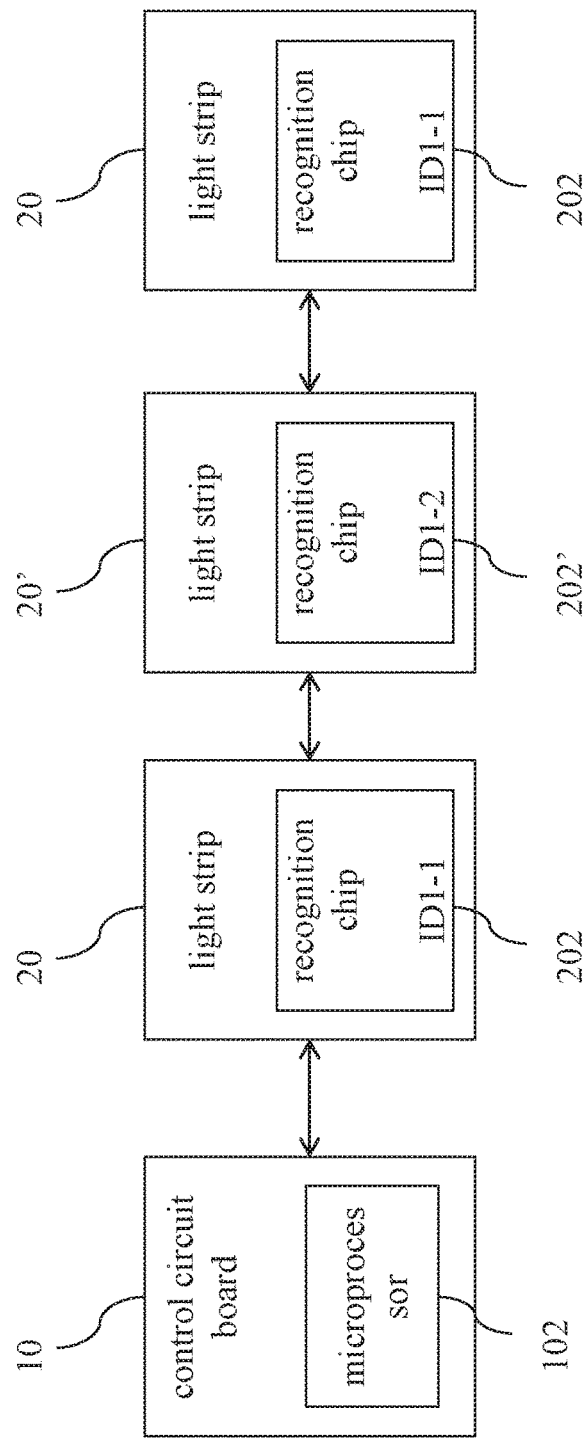
FIG. 3B is a diagram showing a system for recognizing different models of light strips connected in series according to an embodiment of the present invention.

FIG. 3B is a diagram showing a system for recognizing different models of light strips connected in series according to an embodiment of the present invention. The embodiment exemplifies two models of light strips 20 and 20'. Since the control circuit board 10 is connected with the recognition chip 202 of the light strip 20, recognition codes of the recognition chips 202 and 202' of the light strips 20 and 20' are respectively ID1-1 and ID1-2 according to the order of the light strips 20 and 20' connected in series. The microprocessor 102 of the control circuit board 10 is firstly connected with the recognition chip 202 of the light strip 20. Thus, the recognition chip 202 transmits the recognition code ID1-1 back and informs the microprocessor 102 of a fact that the channel is connected with the light strip 20 corresponding to the recognition code ID1-1. When the light strip 20 is connected with the next-following light strip 20', the recognition chip 202' of the light strip 20' transmits its recognition code ID1-2 back to the recognition chip 202 of the next-preceding light strip 20. Then, the recognition chip 202 of the light strip 20 transmits the recognition code ID1-2 of the light strip 20' back to the microprocessor 102 of the control circuit board 10. By the same token, the last light strip 20 transmits its recognition code ID1-1 back to the microprocessor 102 of the control circuit board 10 through the recognition chips 202' and 202 of the light strips 20' and 20. In this way, the microprocessor 102 of the control circuit board 10 knows that two light strips 20 corresponding to the recognition codes ID1-1 and one light strip 20' corresponding to the recognition code ID1-2 are connected with the channel, wherein the control circuit board 10 is sequentially connected with the light strip 20, the light strip 20', and the light strip 20.

Figure 3C:
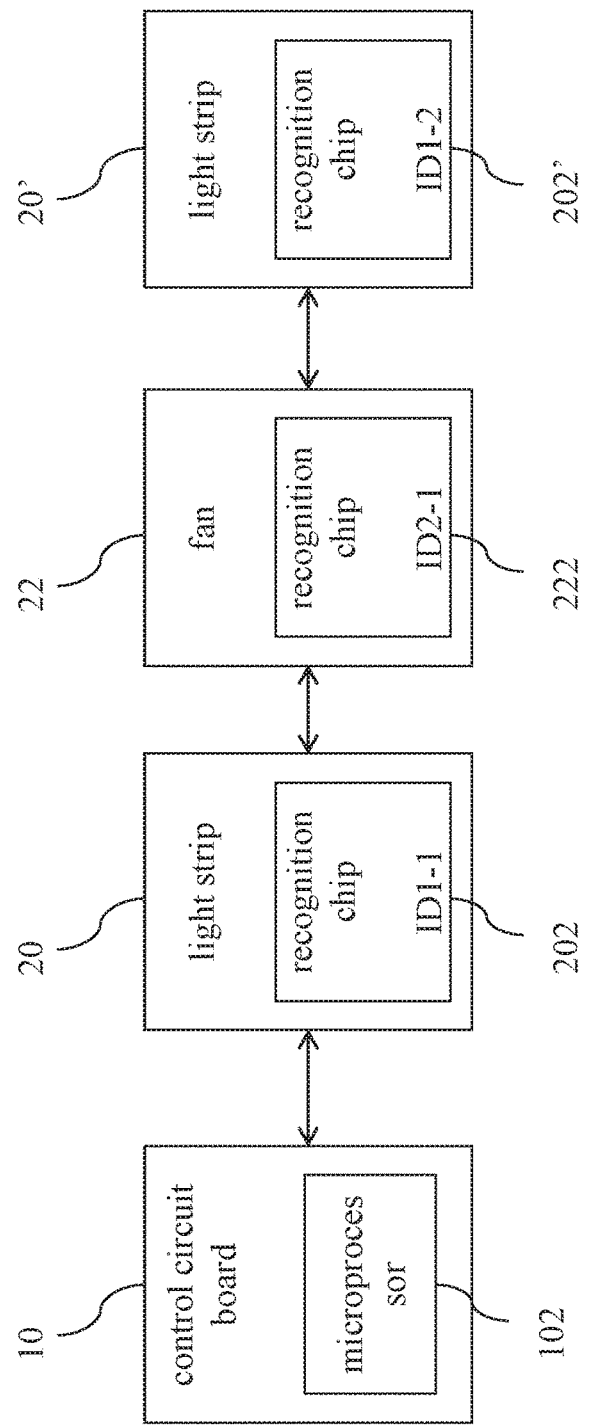
FIG. 3C is a diagram showing a system for recognizing a fan and different models of light strips connected in series according to an embodiment of the present invention.

FIG. 3C is a diagram showing a system for recognizing a fan and different models of light strips connected in series according to an embodiment of the present invention. The embodiment exemplifies two models of light strips 20 and 20' and one fan 22. Since the control circuit board 10 is connected with the recognition chip 202 of the light strip 20, recognition codes of the recognition chips 202 and 202' of the light strips 20 and 20' are respectively ID1-1 and ID1-2 according to the order of the light strips 20 and 20' connected in series. The microprocessor 102 of the control circuit board 10 is firstly connected with the recognition chip 202 of the light strip 20. Thus, the recognition chip 202 transmits the recognition code ID1-1 back and informs the microprocessor 102 of a fact that the channel is connected with the light strip 20 corresponding to the recognition code ID1-1. When the light strip 20 is connected with the fan 22, the recognition chip 222 of the fan 22 transmits its recognition code ID2-1 back to the recognition chip 202 of the light strip 20. Then, the recognition chip 202 of the light strip 20 transmits the recognition code ID2-1 of the fan 22 back to the microprocessor 102 of the control circuit board 10. By the same token, the last light strip 20' transmits its recognition code ID1-2 back to the microprocessor 102 of the control circuit board 10 through the recognition chips 222 and 202 of the fan 22 and the light strip 20. In this way, the microprocessor 102 of the control circuit board 10 knows that one light strip 20 corresponding to the recognition code ID1-1, one fan 22 corresponding to the recognition code ID2-1, and one light strip 20' corresponding to the recognition code ID1-2 are connected with the channel.

Figure 3D:
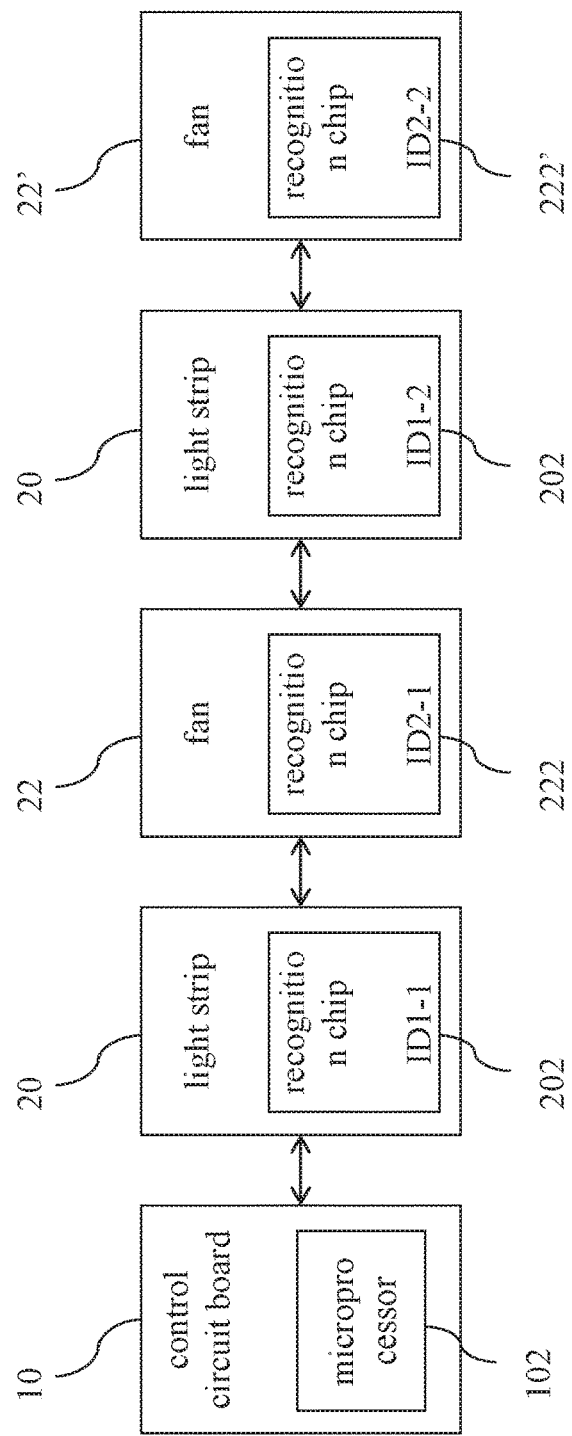
FIG. 3D is a diagram showing a system for recognizing different models of fans and different models of light strips connected in series according to an embodiment of the present invention.

FIG. 3D is a diagram showing a system for recognizing different models of fans and different models of light strips connected in series according to an embodiment of the present invention. The embodiment exemplifies two models of fans 22 and 22' and two models of light strips 20 and 20'. Since the control circuit board 10 is connected with the recognition chip 202 of the light strip 20, recognition codes of the recognition chips 202 and 202' of the light strips 20 and 20' are respectively ID1-1 and ID1-2 according to the order of the light strips 20 and 20' connected in series. By the same token, since the fan 22 is closer to the control circuit board 10, recognition codes of the recognition chips 222 and 222' of the fans 22 and 22' are respectively ID2-1 and ID2-2 according to the order of the fans 22 and 22' connected in series. The microprocessor 102 of the control circuit board 10 is firstly connected with the recognition chip 202 of the light strip 20. Thus, the recognition chip 202 transmits the recognition code ID1-1 and informs the microprocessor 102 of a fact that the channel is connected with the light strip 20 corresponding to the recognition code ID1-1. Then, the light strip 20 is connected with the fan 22. The recognition chip 222 of the fan 22 transmits its recognition code ID2-1 back to the recognition chip 202 of the strip 20. Then, the recognition chip 202 of the strip 20 transmits the recognition code ID2-1 back to the microprocessor 102 of the control circuit board 10. By the same token, the next-following light strip 20' transmits its recognition code ID1-2 back to the microprocessor 102 of the control circuit board 10 through the recognition chips 222 and 202 of the fan 22 and the light strip 20. Finally, the next-following fan 22' transmits its recognition code ID2-2 back to the microprocessor 102 of the control circuit board 10 through the recognition chips 202', 222, and 202 of the light strip 20', the fan 22, and the light strip 20. As a result, the microprocessor 102 of the control circuit board 10 know that the channel is connected with one light strip 20 corresponding to the recognition code ID1-1, one fan 22 corresponding to the recognition code ID2-1, one light strip 20' corresponding to the recognition code ID1-2, and one fan 22' corresponding to the recognition code ID2-2.

The recognition code is set in the communication protocol predefined by the system. Each electronic element (LED strip, LED fan, or LED lamp) has its classification code. Then, the size (model) and the number of each element are encoded in the protocol. In the abovementioned embodiment, the type of the electronic element may be determined as a light strip or a LED fan according to the classification code of the recognition code. According to the serial number of the recognition code, the order and the models of the electronic elements are determined. This is because the same model of the electronic elements has the same serial number.

Accordingly, after detecting the order of the electronic elements connected in series, the control circuit board accurately controls each electronic element and respectively controls different light strips or LEDs of lighting fans.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A system for recognizing electronic elements, and the system comprising:
   a control circuit board; and
   a first electronic element and at least one second electronic element sequentially electrically connected in series, the first electronic element is electrically connected to the control circuit board, the first electronic element and the at least one second electronic element comprise a light strip, a fan, or a combination of the light strip and the fan each of the first electronic element and the at least one second electronic element is provided with a recognition chip comprising a recognition code, the control circuit board requests the recognition chip of the first electronic element to transmit a corresponding the recognition code back, the recognition chip of the first electronic element_requests the recognition chip of the at least one second electronic element to transmit a corresponding the recognition code back, and the control circuit board sequentially receives the recognition codes according to an order of the first electronic element and the at least one second electronic element connected in series.

2. The system for recognizing electronic elements according to claim 1, wherein the control circuit board is provided with a microprocessor which communicates with the recognition chip of the first electronic element through an I²C interface.

3. The system for recognizing electronic elements according to claim 1, wherein the recognition chips communicate with each other through I²C interfaces.

4. The system for recognizing electronic elements according to claim 1, wherein the control circuit board is provided with at least one conductive channel electrically connected with the first electronic element and the at least one second electronic element connected in series.

5. The system for recognizing electronic elements according to claim 4, wherein the control circuit board independently recognizes and controls the first electronic element and the at least one second electronic element connected with different the conductive channel.

6. The system for recognizing electronic elements according to claim 1, wherein the recognition code of each of the first electronic element and the at least one second electronic element comprises a classification code and a serial number, and the light strip and the fan have different the classification codes.

7. The system for recognizing electronic elements according to claim 6, wherein the serial number corresponds to the order of the first electronic element and the at least one second electronic element connected in series.

8. A method for recognizing electronic elements, and the method comprising:
   sequentially electrically connecting a first electronic element with at least one second electronic element in series, the first electronic element and the at least one second electronic element comprise a light strip, a fan, or a combination of the light strip and the fan, and each of the first electronic element and the at least one second electronic element provided with a recognition chip comprising a recognition code, and the first electronic element electrically connected with a control circuit board;
   the control circuit board requesting the recognition chip of the first electronic element to transmit a corresponding the recognition code back, and the recognition chip of the first electronic element_transmitting the corresponding the recognition code back to the control circuit board and requesting the recognition chip of the at least one second electronic element to transmit a corresponding the recognition code back;
   the recognition chip of the at least one second electronic element transmitting the corresponding the recognition code back to the recognition chip of the first electronic element; and
   the control circuit board sequentially receiving the recognition codes according to an order of the first electronic element and the at least one second electronic elements connected in series.

9. The method for recognizing electronic elements according to claim 8, wherein the control circuit board is provided with a microprocessor which communicates with the recognition chip of the first electronic element through an I²C interface.

10. The method for recognizing electronic elements according to claim 8, wherein the recognition chips communicate with each other through I²C interfaces.

11. The method for recognizing electronic elements according to claim 8, wherein the control circuit board is provided with at least one conductive channel electrically connected with the first electronic element and the at least one second electronic element connected in series.

12. The method for recognizing electronic elements according to claim 11, wherein the control circuit board independently recognizes and controls the first electronic element and the at least one second electronic element connected with different the conductive channel.

13. The method for recognizing electronic elements according to claim 8, wherein the recognition code of each of the first electronic element and the at least one second electronic element comprises a classification code and a serial number, and the light strip and the fan have different the classification codes.

14. The method for recognizing electronic elements according to claim 13, wherein the serial number corresponds to the order of the first electronic element and the at least one second electronic element connected in series.

* * * * *